US012671798B2

(12) United States Patent
Kobayashi et al.

(10) Patent No.: US 12,671,798 B2
(45) Date of Patent: Jun. 30, 2026

(54) INFORMATION PROCESSING APPARATUS AND INFORMATION PROCESSING METHOD

(71) Applicant: SONY GROUP CORPORATION, Tokyo (JP)

(72) Inventors: Yuto Kobayashi, Tokyo (JP); Noriaki Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 324 days.

(21) Appl. No.: 18/249,018

(22) PCT Filed: Oct. 11, 2021

(86) PCT No.: PCT/JP2021/037524
§ 371 (c)(1),
(2) Date: Apr. 13, 2023

(87) PCT Pub. No.: WO2022/091757
PCT Pub. Date: May 5, 2022

(65) Prior Publication Data
US 2023/0410261 A1     Dec. 21, 2023

(30) Foreign Application Priority Data

Oct. 27, 2020     (JP) ................................. 2020-179816

(51) Int. Cl.
*G06T 5/00*          (2024.01)
*G06T 5/70*          (2024.01)
(Continued)

(52) U.S. Cl.
CPC ............. *H04N 13/383* (2018.05); *G06T 5/70* (2024.01); *H04N 13/125* (2018.05)

(58) Field of Classification Search
CPC ....... H04N 13/383; H04N 13/125; G06T 5/70
See application file for complete search history.

(56) References Cited

U.S. PATENT DOCUMENTS 6,198,484 B1 *   3/2001   Kameyama ............. G06T 15/10
                                                                          348/42
2005/0180740 A1     8/2005   Yokoyama
(Continued)

FOREIGN PATENT DOCUMENTS

CN          111757090 A        10/2020
JP          H09200803 A        7/1997
(Continued)

OTHER PUBLICATIONS 1994-2023 IP.com.*
(Continued)

*Primary Examiner* — Quang N Vo
(74) *Attorney, Agent, or Firm* — CHIP LAW GROUP

(57) ABSTRACT

Provided is an information processing apparatus that includes a viewpoint position detection unit and a correction processing unit. The viewpoint position detection unit detects a viewpoint position (PS) of an observer. The correction processing unit detects a gaze point (GP) on a viewpoint image (VPI) corresponding to the viewpoint position (PS). The correction processing unit blurs an outer edge of the viewpoint image (VPI) away from the gaze point (GP) in a parallax direction.

6 Claims, 7 Drawing Sheets

(51) Int. Cl.
  *H04N 13/125*      (2018.01)
  *H04N 13/383*      (2018.01)

(56)                References Cited

U.S. PATENT DOCUMENTS

| | | | |
|---|---|---|---|
| 2014/0085296 | A1 | 3/2014 | Baik |
| 2014/0285641 | A1* | 9/2014 | Kato ...................... G06T 19/00 |
| | | | 348/54 |
| 2016/0191908 | A1 | 6/2016 | Yen et al. |
| 2017/0352177 | A1* | 12/2017 | Aiba .......................... G06T 5/73 |

FOREIGN PATENT DOCUMENTS

| | | | |
|---|---|---|---|
| JP | 2002-170131 | A | 6/2002 |
| JP | 2002-176661 | A | 6/2002 |
| JP | 2005-208182 | A | 8/2005 |
| JP | 2012-147046 | A | 8/2012 |
| JP | 2013-183426 | A | 9/2013 |
| JP | 2013-214052 | A | 10/2013 |
| JP | 2019-102828 | A | 6/2019 |
| WO | WO-2017047178 | A1 | 3/2017 |

OTHER PUBLICATIONS

NPL: Results Publication Date Range: Apr. 30, 1996 to Sep. 25, 2025.*

International Search Report and Written Opinion of PCT Application No. PCT/JP2021/037524, issued on Dec. 21, 2021, 11 pages of ISRWO.

* cited by examiner

ALLOCATION OF PIXELS IN MULTI-
VIEW IMAGE OF THREE OR MORE
VIEWPOINTS

ATTACHMENT OF PIXELS
IN CASE WHERE THERE
IS VERTICAL PARALLAX

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/037524 filed on Oct. 11, 2021, which claims priority benefit of Japanese Patent Application No. JP 2020-179816 filed in the Japan Patent Office on Oct. 27, 2020. Each of the above-referenced applications is hereby incorporated herein by reference in its entirety.

FIELD

The present invention relates to an information processing apparatus, an information processing method, and a program.

BACKGROUND

A display device for displaying a stereoscopic image and a multi-view image has a problem of image deterioration due to crosstalk. Therefore, there has been proposed a technique for inhibiting crosstalk by inverse correction processing of performing conversion inverse to conversion caused by the crosstalk.

CITATION LIST

Patent Literature

Patent Literature 1: JP 2013-183426 A
Patent Literature 2: JP 2013-214052 A

SUMMARY

Technical Problem

In inverse correction processing, image processing of reducing a signal value of a pixel whose luminance increases due to crosstalk and increasing a signal value of a pixel whose luminance decreases is performed. A gradation range of the image is, however, limited to 0 to 255. For a pixel whose signal value is reduced or increased beyond the saturation constraint, the signal value is clipped to 0 or 255. In a region where the signal value exceeds the saturation constraint, an image is not sufficiently corrected, and it is difficult to satisfactorily inhibit crosstalk.

Therefore, the present disclosure proposes an information processing apparatus, an information processing method, and a program capable of satisfactorily inhibiting crosstalk.

Solution to Problem

According to the present disclosure, an information processing apparatus is provided that comprises: a viewpoint position detection unit that detects a viewpoint position of an observer; and a correction processing unit that detects a gaze point on a viewpoint image corresponding to the viewpoint position and blurs an outer edge of the viewpoint image away from the gaze point in a parallax direction. According to the present disclosure, an information processing method in which an information process of the information processing apparatus is executed by a computer, and a program for causing the computer to execute the information process of the information processing apparatus, are provided.

DESCRIPTION OF EMBODIMENTS

An embodiment of the present disclosure will be described in detail below with reference to the drawings. In the following embodiment, the same reference signs are attached to the same parts to omit duplicate description.

Note that the description will be given in the following order.

[1. Outline]
[2. Configuration of Information Processing Apparatus]
[3. Crosstalk Correction Processing]
[4. Effects]
[5. Variations]

1. Outline

The present disclosure proposes a method of inhibiting crosstalk by using blurring processing. The blurring processing is selectively performed on an image away from a gaze point of an observer. When a part of an image mixed by crosstalk is made unclear by the blurring processing, the crosstalk is not easily recognized. Even when an image away from the gaze point that is not easily recognized by the observer is blurred, deterioration in image quality does not easily occur. Therefore, the crosstalk can be inhibited while the deterioration in image quality is inhibited. Hereinafter, crosstalk correction processing of the present disclosure will be specifically described below.

2. Configuration of Information Processing Apparatus

Figure 1:
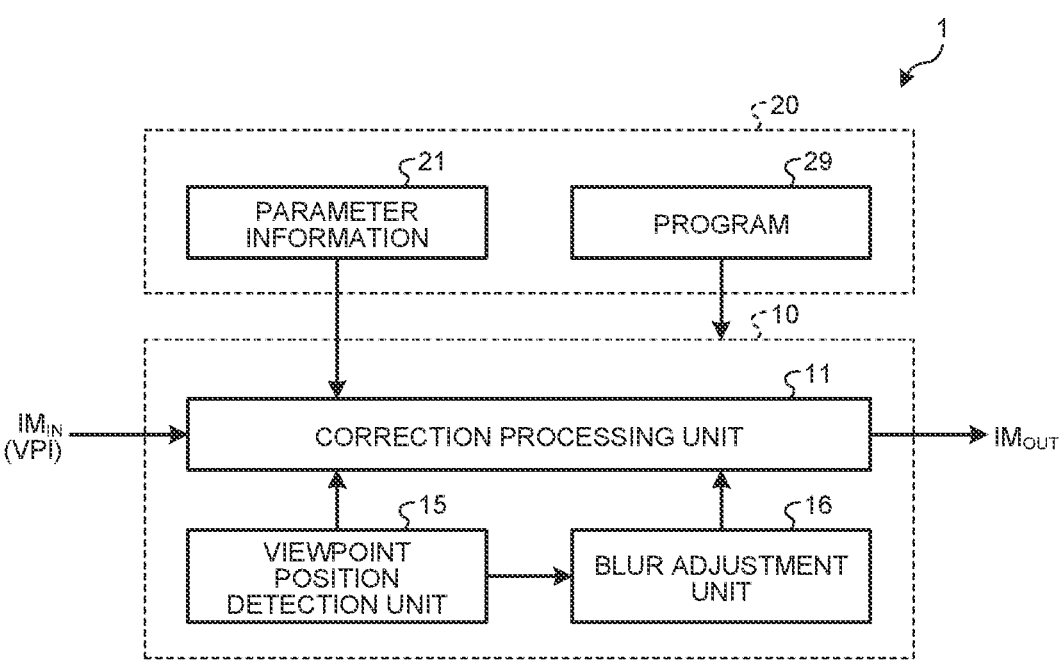
FIG. 1 illustrates one example of an information processing apparatus.

FIG. 1 illustrates one example of an information processing apparatus 1 for performing the crosstalk correction processing of the present disclosure.

The information processing apparatus 1 includes a processing device 10 and a storage device 20. The crosstalk correction processing of the present disclosure can be applied to crosstalk between two viewpoints and crosstalk between three or more multiple viewpoints. A three-dimensional (3D) display is known as a display for two viewpoints. An example in which the crosstalk correction processing of the present disclosure is applied to a naked-eye 3D display will be described below.

The processing device 10 includes a correction processing unit 11, a viewpoint position detection unit 15, and a blur adjustment unit 16.

The correction processing unit 11 performs blurring processing on an input image $IM_{IN}$ to generate an output image $IM_{out}$. The input image $IM_{IN}$ is an original image or a corrected image obtained by performing some correction processing on the original image. The input image $IM_{IN}$ includes a plurality of viewpoint images VPI. In the present embodiment, 3D display is performed, and the input image $IM_{IN}$ thus includes a left eye input image $LI_{IN}$ and a right eye input image $RI_{IN}$ as the plurality of viewpoint images VPI (see FIG. 3).

The viewpoint position detection unit 15 detects a viewpoint position PS (see FIG. 2) of an observer based on head tracking. For example, a viewpoint position PS (left eye viewpoint position PSL) at which a left eye viewpoint image VPI is observed is the center of the pupil of the left eye. A viewpoint position PS (right eye viewpoint position PSR) at which a right eye viewpoint image VPI is observed is the center of the pupil of the right eye. The viewpoint position detection unit 15 outputs viewpoint position information including coordinate information of the viewpoint position PS to the correction processing unit 11 and the blur adjustment unit 16.

The correction processing unit 11 detects a gaze point GP (see FIG. 2) on the viewpoint image VPI corresponding to the viewpoint position PS. The gaze point GP is detected by following a path of light incident on the viewpoint position PS. A left eye gaze point GPL is located at the center of the left eye viewpoint image VPI. A right eye gaze point GPR is located at the center of the right eye viewpoint image VPI. The correction processing unit 11 blurs an outer edge of the viewpoint image VPI away from the gaze point GP in a parallax direction.

The blur adjustment unit 16 detects the moving speed of the viewpoint position PS based on the viewpoint position information. The blur adjustment unit 16 adjusts the distribution of a blur amount in the viewpoint image VPI based on the moving speed of the viewpoint position PS. For example, the blur adjustment unit 16 greatly decreases the blur amounts of all the pixels in the viewpoint image VPI as the moving speed of the viewpoint position increases.

The storage device 20 stores, for example, a program 29 executed by the processing device 10 and the parameter information 21. The program 29 causes a computer to execute information processing according to the present disclosure. The processing device 10 performs various pieces of processing in accordance with the program 29 stored in the storage device 20. The storage device 20 may be used as a work area for temporarily storing a processing result of the processing device 10. The storage device 20 includes any non-transitory storage medium, such as a semiconductor storage medium and a magnetic storage medium. The storage device 20 includes, for example, an optical disk, a magneto-optical disk, and a flash memory. The program 29 is stored in, for example, a non-transitory computer-readable storage medium.

The processing device 10 is, for example, a computer including a processor and a memory. The memory of the processing device 10 includes a random access memory (RAM) and a read only memory (ROM). The processing device 10 functions as the correction processing unit 11, the viewpoint position detection unit 15, and the blur adjustment unit 16 by executing the program 29.

3. Crosstalk Correction Processing

One example of the crosstalk correction processing of the present disclosure will be described below with reference to FIGS. 2 to 4.

The blurring processing is crosstalk correction processing of blurring an outer edge of the viewpoint image VPI away from the center portion (gaze point GP of observer) of the viewpoint image VPI in a parallax direction. "Blurring" means making an unclear view. The blurring processing include smoothing processing using a Gaussian filter, mosaic processing, and level correction processing of lowering a signal value to darken an outer edge.

Figure 2:
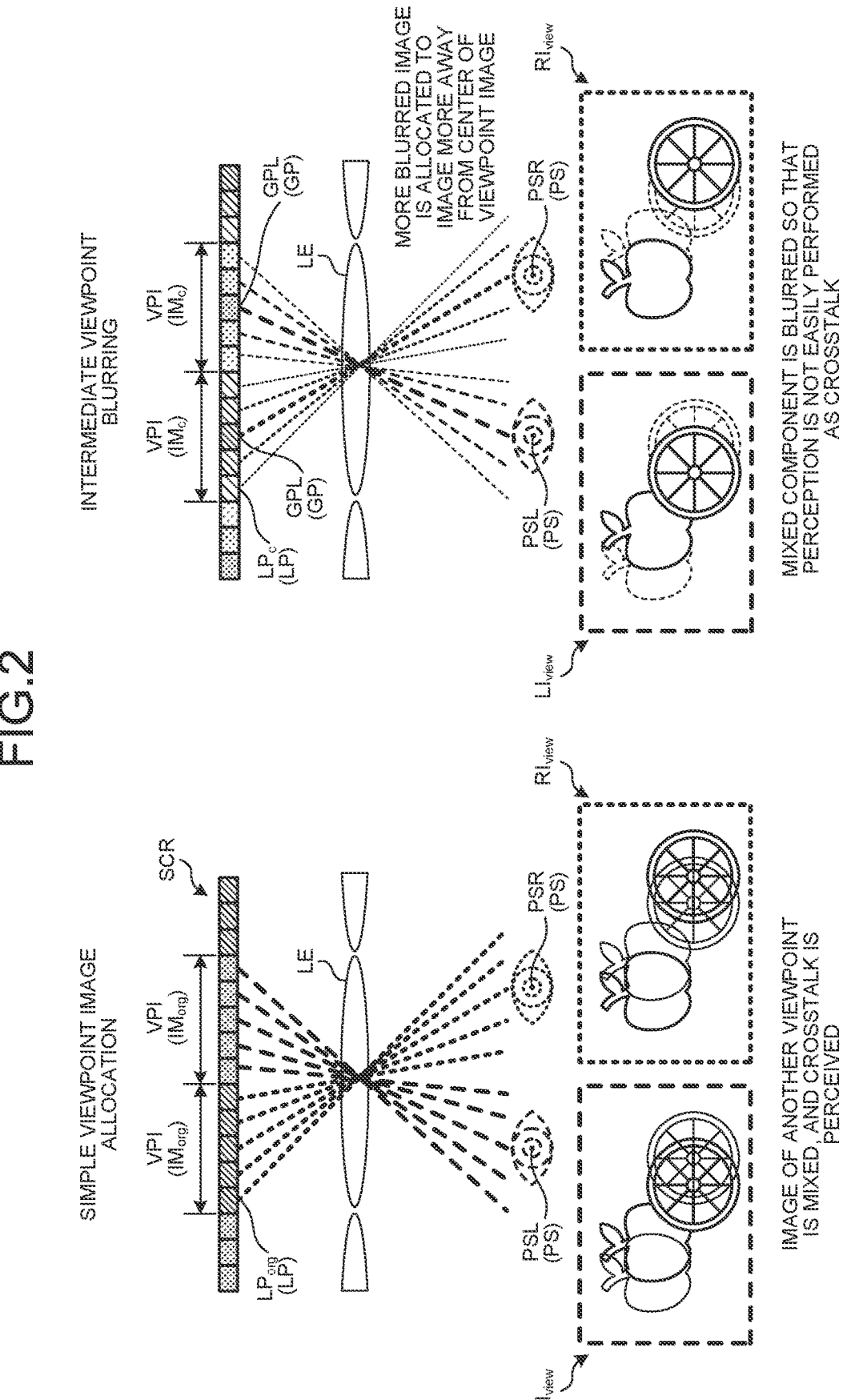
FIG. 2 illustrates one example of crosstalk correction processing.

As illustrated in FIG. 2, a plurality of viewpoint images VPI is arranged in the parallax direction on a screen SCR. Parallax occurs in the parallax direction. For example, an extending direction of a line obtained by projecting a line connecting a right eye and a left eye of an observer onto the screen SCR is the parallax direction. One viewpoint image VPI includes a plurality of line images LP adjacent in the parallax direction. One viewpoint image VPI has a width corresponding to those of the plurality of line images.

In the example on the left side of FIG. 2, a plurality of line images $LP_{org}$ in the original image $IM_{org}$ is allocated to one viewpoint image VPI. Since the line images $LP_{org}$ not subjected to the crosstalk correction processing are displayed as it is, crosstalk is strongly recognized in the left eye perceptual image $LI_{view}$ and the right eye perceptual image $RI_{view}$. Note that the left eye perceptual image $LI_{view}$ is perceived by the left eye of the observer, and the right eye perceptual image $RI_{view}$ is perceived by the right eye of the observer. In the perceptual image, a plurality of viewpoint images VPI is mixed by crosstalk.

In the example on the right side of FIG. 2, a plurality of line images $LP_c$ in the corrected image $IM_c$ is allocated to one viewpoint image VPI. The blurring processing is performed on the corrected image $IM_c$. Since the image subjected to the blurring processing is mixed by crosstalk, the crosstalk is not easily recognized in the left eye perceptual image $LI_{view}$ and the right eye perceptual image $RI_{view}$.

The correction processing unit 11 selectively blurs one or more line images LP, in which the gaze point GP is not located, among the plurality of adjacent line images LP. Light emitted from the outer edge of the viewpoint image VPI is incident on a position shifted from the center of the pupil. Therefore, the line image LP of the outer edge of the viewpoint image VPI is hardly recognized by the observer. Light, however, may spread due to an influence of aberration of a lens LE and the like, and the line image LP of the outer edge may be recognized as a crosstalk component. In the present disclosure, central portions of the viewpoint images VPI recognized as a left eye image and a right eye image are referred to as direct viewpoints, and positions other than the direct viewpoints are referred to as intermediate viewpoints. The line images LP of the intermediate viewpoints are not easily recognized as the left eye image and the right eye image. Therefore, the correction processing unit 11 selectively blurs the line images LP of the intermediate viewpoints.

Figure 3:
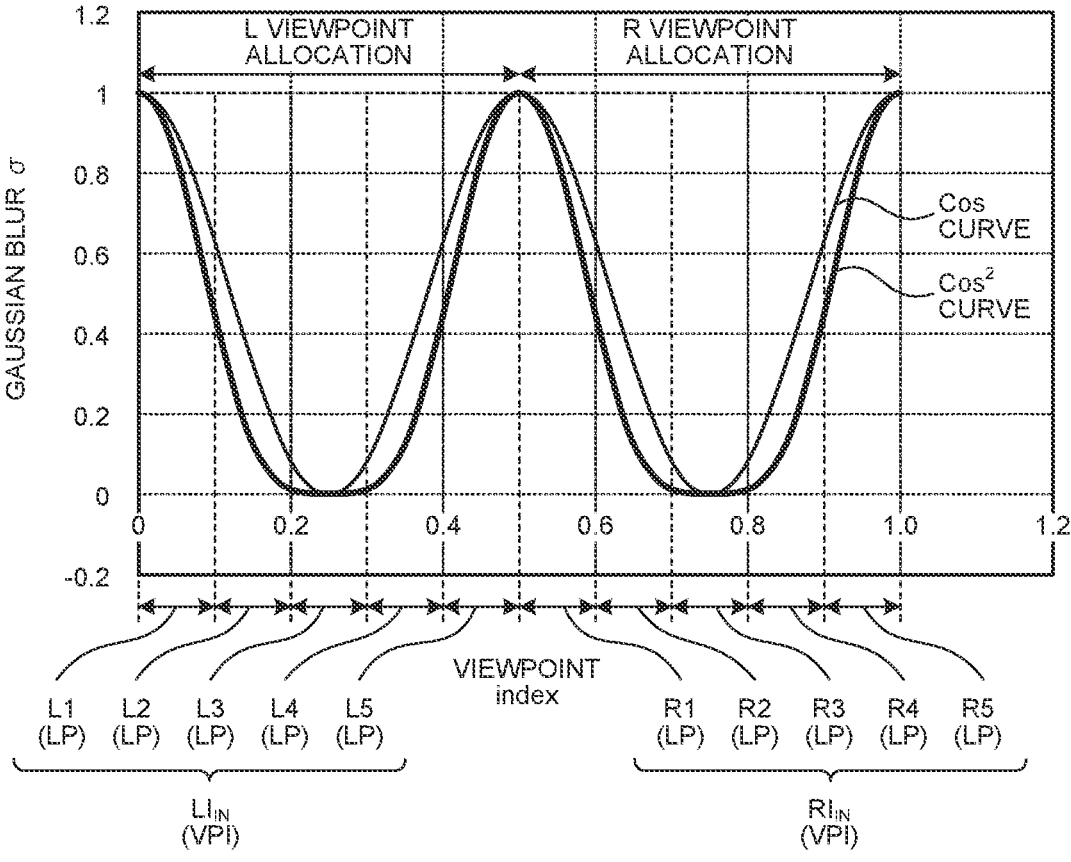
FIG. 3 illustrates one example of the crosstalk correction processing.

As illustrated in FIG. 3, the correction processing unit 11 varies the size of a blur of the line image LP in accordance with a distance from the gaze point GP, for example. In FIG. 3, each of viewpoint indexes L1 to L5 is attached to each of five line images LP in the left eye input image $LI_{IN}$. A viewpoint index L3 is a direct viewpoint of the left eye, and viewpoint indexes L1, L2, L4, and L5 are intermediate viewpoints of the left eye. Each of viewpoint indexes R1 to R5 is attached to each of five line images LP in the right eye input image $RI_{IN}$. A viewpoint index R3 is a direct viewpoint of the right eye, and viewpoint indexes R1, R2, R4, and R5 are intermediate viewpoints of the right eye.

For example, Gaussian blurring is adopted as the blurring processing. The size of a blur is represented by a standard deviation σ. The correction processing unit 11 blurs a line image LP more greatly as the line image LP is located farther from the gaze point GP. The size of a blur (standard deviation σ) is represented by a monotonic function that monotonically increases from the center of the viewpoint image VPI toward an end of the viewpoint image VPI. In the example of FIG. 3, the monotonic function is represented by a cosine curve or a cosine square curve. The monotonic function is, however, not limited thereto. The parameter information 21 includes information on the correspondence relation between a viewpoint index and a size of a blur.

Figure 4:
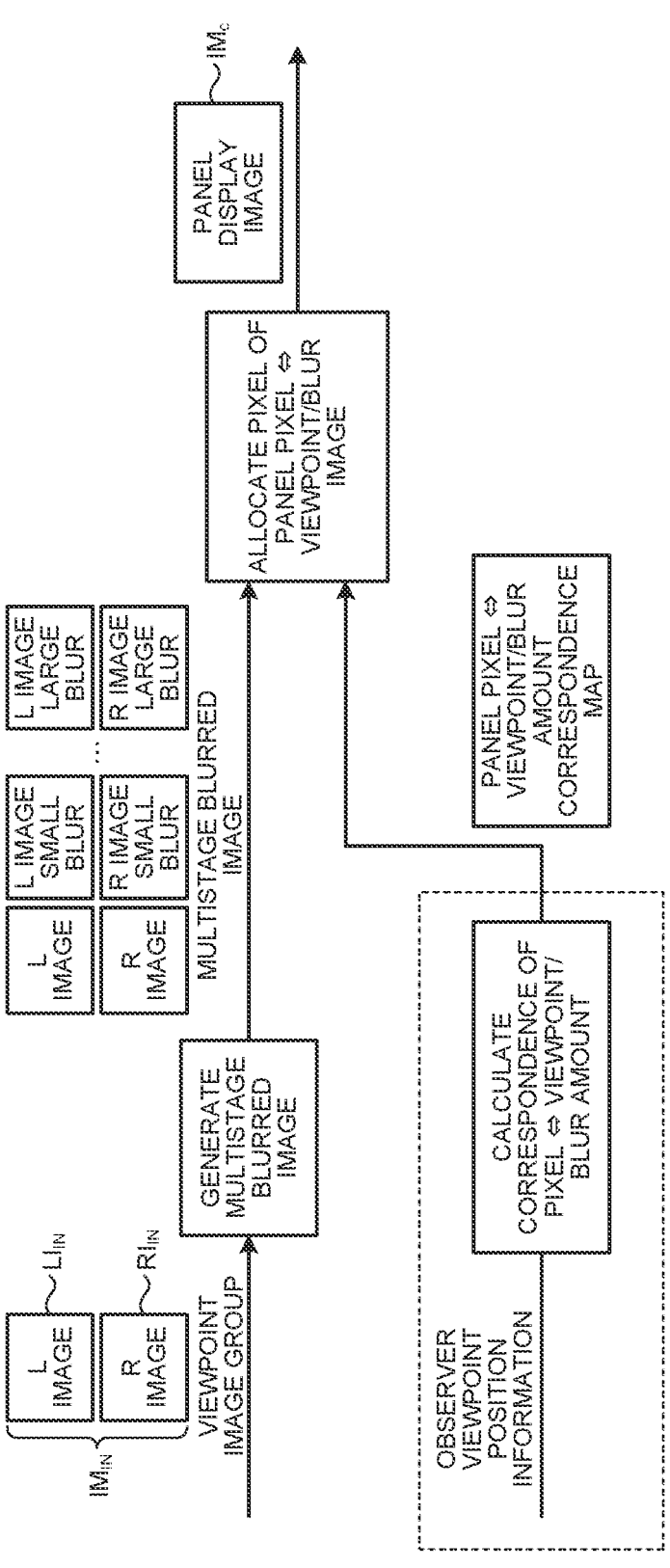
FIG. 4 illustrates one example of the crosstalk correction processing.

As illustrated in FIG. 4, the correction processing unit 11 determines the correspondence relation between a pixel group of the screen SCR and each viewpoint image VPI, allocation of viewpoint indexes in a viewpoint image VPI, and distribution of the size of a blur (blur amount) in the viewpoint image VPI based on viewpoint position information of the observer. The correction processing unit 11 generates a multistage blurred image, and outputs the multistage blurred image as the corrected image $IM_c$ based on the determined information. In the multistage blurred image, the blur amount is controlled in multiple stages in accordance with the distance from the gaze point GP.

Figure 5:
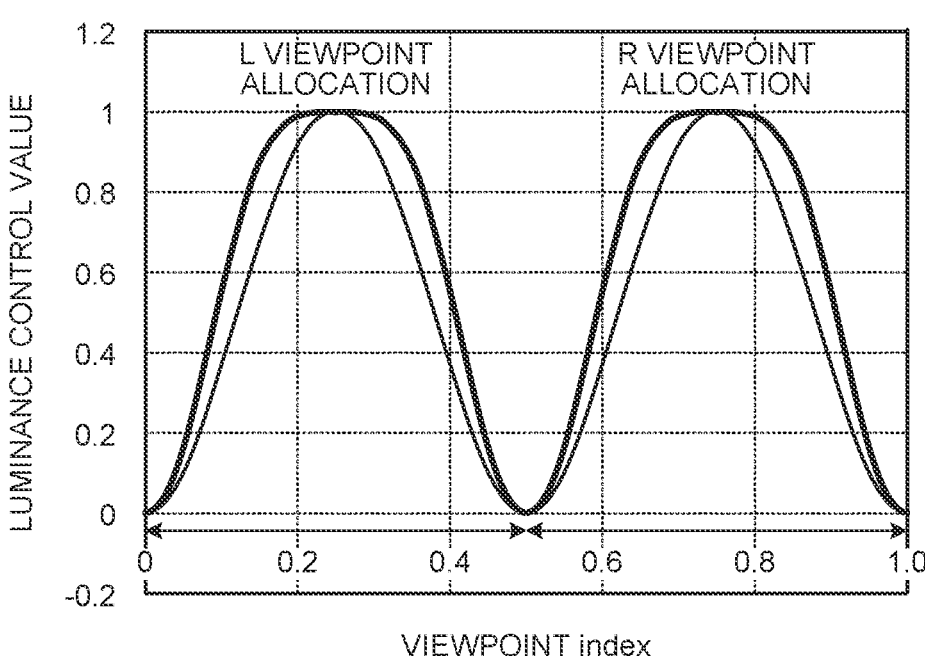
FIG. 5 illustrates another example of the crosstalk correction processing.

Although, in FIG. 3, Gaussian blurring is used as the blurring processing, the blurring processing is not limited thereto. For example, as illustrated in FIG. 5, the outer edge of the viewpoint image VPI can be made less noticeable than the central portion by reducing the luminance of the line image LP of the intermediate viewpoint. For example, the size of a blur is defined as a luminance control value of the line image LP. The luminance control value is represented by a monotonic function that monotonically increases from the center of the viewpoint image VPI toward an end of the viewpoint image VPI. The correction processing unit 11 reduces signal values of all the pixels in the line image LP by the luminance control value. The parameter information 21 includes information on the luminance control value.

Figure 6:
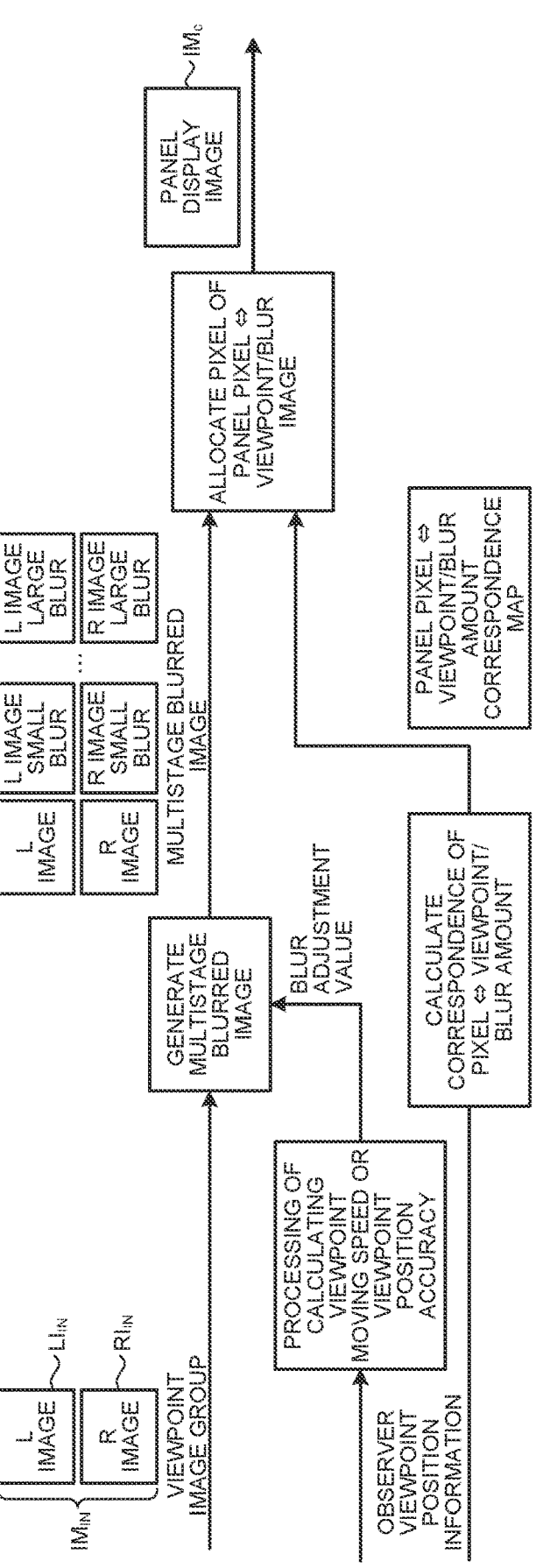
FIG. 6 illustrates another example of the crosstalk correction processing.

The correction processing unit 11 changes the corrected image $IM_c$ in accordance with timing when the viewpoint position PS of the observer (head of observer) moves so that an image with no blur is displayed at the gaze point GP. When a moving speed of the viewpoint position PS is large, however, the change of the corrected image $IM_c$ is not in time, and the observer may strongly recognize the line image LP (blurred image) of the intermediate viewpoint. Therefore, as illustrated in FIG. 6, the correction processing unit 11 can vary the distribution of the blur amount in a viewpoint image VPN in accordance with the moving speed of the viewpoint position PS.

For example, one or more thresholds are set for the moving speed of the viewpoint position PS. A blur adjustment value is set for each threshold. The blur adjustment value is represented by a monotonic function that monotonically increases with an increase in the moving speed of the viewpoint position PS. When the moving speed of the viewpoint position PS is larger than the threshold, the correction processing unit 11 reduces the blur amounts of the line images LP of all the intermediate viewpoints by the blur adjustment value corresponding to the threshold. As the moving speed of the viewpoint position PS increases, the correction amount (blur amount) of the blurring processing decreases. The parameter information 21 includes information on the threshold and the blur adjustment value.

Even when the measurement accuracy of the viewpoint position PS in the head tracking is low, a similar problem may occur. Therefore, the correction processing unit 11 may set a blur adjustment value for each measurement accuracy of the viewpoint position PS, and vary the distribution of the blur amount in the viewpoint image VPN in accordance with the measurement accuracy.

4. Effects

The information processing apparatus 1 includes the viewpoint position detection unit 15 and the correction processing unit 11. The viewpoint position detection unit 15 detects the viewpoint position PS of the observer. The correction processing unit 11 detects a gaze point GP on the viewpoint image VPI corresponding to the viewpoint position PS. The correction processing unit 11 blurs an outer edge of the viewpoint image VPI away from the gaze point GP in a parallax direction. In the information processing method of the present embodiment, the processing of the information processing apparatus 1 described above is executed by the computer. The program 29 of the present embodiment causes a computer to perform the processing of the information processing apparatus 1 described above.

According to the configuration, the viewpoint image VPI subjected to the blurring processing is mixed by crosstalk. Therefore, the crosstalk is not easily recognized. The observer does not easily recognize an image of an outer edge away from the gaze point GP. Therefore, even if the image of an outer edge is blurred, the image quality is not easily impaired. Therefore, the crosstalk can be reduced while deterioration in image quality caused by blurring is inhibited.

The viewpoint image VPI includes a plurality of line images LP adjacent in the parallax direction. The correction processing unit 11 selectively blurs one or more line images LP, in which the gaze point GP is not located, among the plurality of line images LP.

According to the configuration, the blurring processing is not performed on the line image LP near the gaze point GP that is easily recognized by the observer. Therefore, deterioration in image quality caused by blurring does not easily occur.

The correction processing unit 11 blurs a line image LP more greatly as the line image LP is located farther from the gaze point GP.

According to the configuration, crosstalk can be reduced more satisfactorily while deterioration in image quality caused by blurring is inhibited.

The correction processing unit 11 varies the distribution of a blur amount in the viewpoint image VPI in accordance with the moving speed of the viewpoint position PS.

According to the configuration, recognizability of a blurred image at the time when the viewpoint position PS moves can be controlled.

As the moving speed of the viewpoint position PS increases, the blur amount decreases.

According to the configuration, a blur is not easily recognized when the viewpoint position PS quickly moves.

Note that the effects described in the present specification are merely examples and not limitations. Other effects may be obtained.

5. Variations

Figure 7:
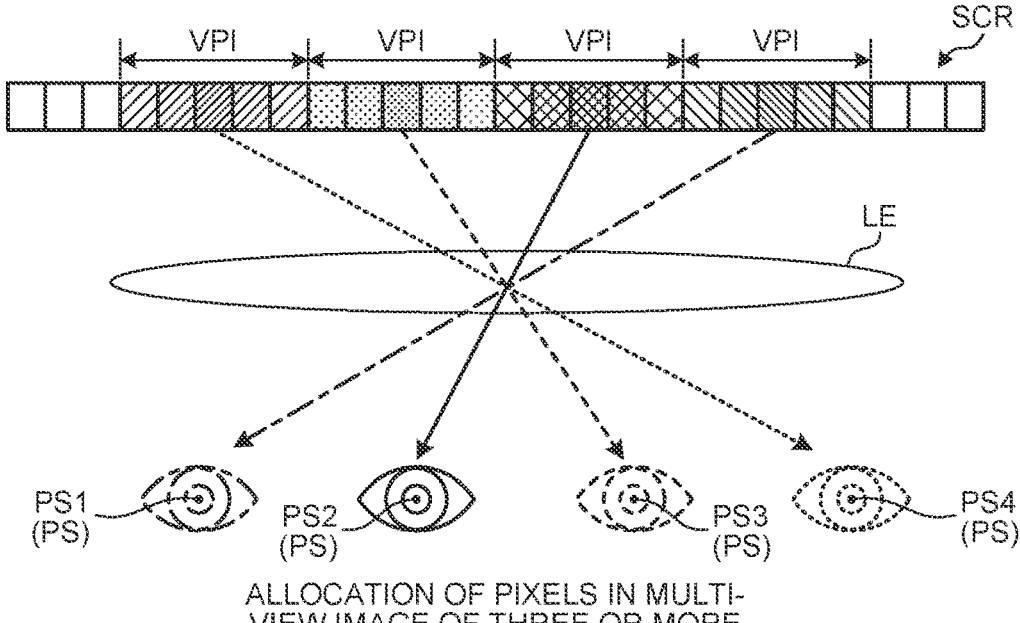
FIG. 7 illustrates another application example of the crosstalk correction processing.
Figure 8:
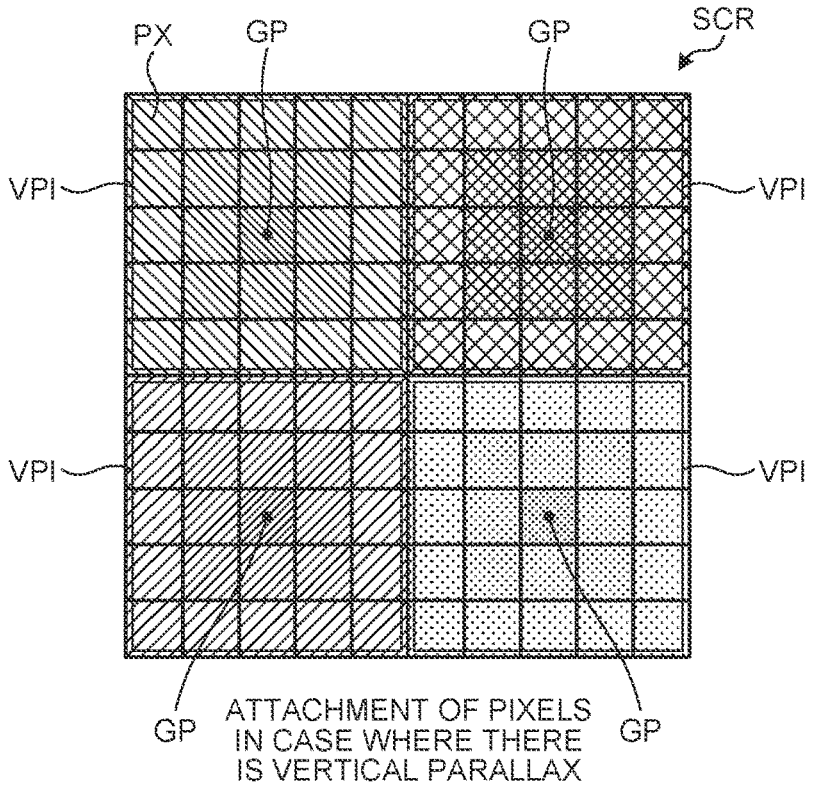
FIG. 8 illustrates another application example of the crosstalk correction processing.

FIGS. 7 and 8 illustrate another application example of the crosstalk correction processing.

In the above-described embodiment, the crosstalk correction processing of the present disclosure is applied to a naked-eye 3D display. The information processing of the present disclosure may be, however, applied to a spectacle type 3D display.

The crosstalk correction processing of the present disclosure can also be applied to crosstalk between three or more multiple viewpoints. Although, in the example of FIG. 7, the information processing of the present disclosure is applied to a display for displaying four viewpoint images VPI, there may be three or five or more viewpoints. Although, in the example of FIG. 7, four viewpoint images VPI are distributed to a viewpoint position PS1, a viewpoint position PS2, a viewpoint position PS3, and a viewpoint position PS4 by a lenticular lens LE, a means for spatially separating the viewpoint images VPI is not limited to the lenticular lens LE. A parallax barrier can also be used as a space separating means. Furthermore, a projector array method can also be applied as a method of displaying a multi-view image.

In the example of FIG. 7, the parallax occurs only in a horizontal direction. Therefore, the four viewpoint images VPI corresponding to the viewpoint positions PS1 to PS4 are alternately displayed in the horizontal direction of the screen SCR. As illustrated in FIG. 8, however, the parallax may occur in two directions of the horizontal direction and the vertical direction. In this case, the four viewpoint images VPI are arranged in a matrix in the horizontal direction and the vertical direction of the screen SCR. The line image LP is a closed linear image such as a circle and a quadrangle. In the example of FIG. 8, the viewpoint image VPI is, for example, a square image. The line image LP is a quadrangular linear image centered on the gaze point GP. One viewpoint image VPI includes a plurality of pixels PX. The correction processing unit 11 determines the correspondence relation between a pixel group of the screen SCR and each viewpoint image VPI such that the center of the viewpoint image VPI corresponds to the gaze point GP. For example, the distribution of a blur amount is set as concentric distribution centered on the gaze point GP.

APPENDIX

Note that the present technology can also have the configurations as follows.

(1)

An information processing apparatus comprising:
a viewpoint position detection unit that detects a viewpoint position of an observer; and
a correction processing unit that detects a gaze point on a viewpoint image corresponding to the viewpoint position and blurs an outer edge of the viewpoint image away from the gaze point in a parallax direction.

(2)

The information processing apparatus according to (1),
wherein the viewpoint image includes a plurality of line images adjacent in a parallax direction, and
the correction processing unit selectively blurs one or more line images, in which the gaze point is not located, among the plurality of line images.

(3)

The information processing apparatus according to (2),
wherein the correction processing unit blurs a line image more greatly as the line image is located farther from the gaze point.

(4)

The information processing apparatus according to any one of (1) to (3), wherein the correction processing unit varies distribution of a blur amount in the viewpoint image in accordance with a moving speed of the viewpoint position.

(5)

The information processing apparatus according to (4),
wherein the blur amount decreases as a moving speed of the viewpoint position increases.

(6)

An information processing method executed by a computer, comprising:
detecting a viewpoint position of an observer;
detecting a gaze point on a viewpoint image corresponding to the viewpoint position; and
blurring an outer edge of the viewpoint image away from the gaze point in a parallax direction.

(7)

A program causing a computer to execute:
detecting a viewpoint position of an observer;
detecting a gaze point on a viewpoint image corresponding to the viewpoint position; and
blurring an outer edge of the viewpoint image away from the gaze point in a parallax direction.

REFERENCE SIGNS LIST

1 INFORMATION PROCESSING APPARATUS
11 CORRECTION PROCESSING UNIT
15 VIEWPOINT POSITION DETECTION UNIT
GP GAZE POINT
LP LINE IMAGE
PS VIEWPOINT POSITION
VPI VIEWPOINT IMAGE

The invention claimed is:

1. An information processing apparatus, comprising:
at least one processor configured to:
detect a viewpoint position of an observer, wherein the viewpoint position corresponds to viewpoint position information;
detect a gaze point on a viewpoint image, wherein
the viewpoint image is on a screen, and
the gaze point corresponds to the viewpoint position;
blur an outer edge of the viewpoint image away from the gaze point in a parallax direction;
vary a blur amount of the blur of the outer edge in the viewpoint image based on a moving speed of the viewpoint position;
determine, based on the viewpoint position information, a correspondence relation between each of the viewpoint image, the blur amount, and a pixel group of the screen; and
generate a multistage blurred image based on the determined correspondence relation between each of the viewpoint image, the blur amount, and the pixel group of the screen.

2. The information processing apparatus according to claim 1, wherein
the viewpoint image includes a plurality of line images adjacent in the parallax direction, and
the at least one processor is further configured to selectively blur at least one line image of the plurality of line images in which the gaze point is not located.

3. The information processing apparatus according to claim 2, wherein
the at least one processor is further configured to blur a first line image, of the plurality of line images, more than a second line image of the plurality of line images, and the first line image is farther from the gaze point with respect to the second line image.

4. The information processing apparatus according to claim 1, wherein the blur amount decreases as the moving speed of the viewpoint position increases.

5. An information processing method comprising:

in an information processing apparatus:

detecting a viewpoint position of an observer, wherein the viewpoint position corresponds to viewpoint position information;

detecting a gaze point on a viewpoint image, wherein the viewpoint image is on a screen, and the gaze point corresponds to the viewpoint position;

blurring an outer edge of the viewpoint image away from the gaze point in a parallax direction;

varying a blur amount of the blur of the outer edge in the viewpoint image based on a moving speed of the viewpoint position;

determining, based on the viewpoint position information, a correspondence relation between each of the viewpoint image, the blur amount, and a pixel group of the screen; and generating a multistage blurred image based on the determined correspondence relation between each of the viewpoint image, the blur amount, and the pixel group of the screen.

6. A non-transitory computer-readable medium having stored thereon, computer-executable instructions which, when executed by a processor, cause the processor to execute operations, the operations comprising:

detecting a viewpoint position of an observer, wherein the viewpoint position corresponds to viewpoint position information;

detecting a gaze point on a viewpoint image, wherein the viewpoint image is on a screen, and the gaze point corresponds to the viewpoint position;

blurring an outer edge of the viewpoint image away from the gaze point in a parallax direction;

varying a blur amount of the blur of the outer edge in the viewpoint image based on a moving speed of the viewpoint position;

determining, based on the viewpoint position information, a correspondence relation between each of the viewpoint image, the blur amount, and a pixel group of the screen; and generating a multistage blurred image based on the determined correspondence relation between each of the viewpoint image, the blur amount, and the pixel group of the screen.

\* \* \* \* \*